(12) United States Patent
Plass et al.

(10) Patent No.: US 10,193,335 B2
(45) Date of Patent: Jan. 29, 2019

(54) RADIO FREQUENCY SURGE PROTECTOR WITH MATCHED PISTON-CYLINDER CAVITY SHAPE

(71) Applicant: Transtector Systems, Inc., Hayden, ID (US)

(72) Inventors: Timothy M. Plass, Post Falls, ID (US); Peter R. Bokma, Couer 'Alene, ID (US)

(73) Assignee: TRANSTECTOR SYSTEMS, INC., Hayden, ID (US)

( * ) Notice: Subject to any disclaimer, the term of this patent is extended or adjusted under 35 U.S.C. 154(b) by 350 days.

(21) Appl. No.: 15/336,655

(22) Filed: Oct. 27, 2016

(65) Prior Publication Data

US 2017/0117704 A1    Apr. 27, 2017

Related U.S. Application Data

(60) Provisional application No. 62/247,067, filed on Oct. 27, 2015.

(51) Int. Cl.
| | |
|---|---|
| *H02H 9/00* | (2006.01) |
| *H02H 9/04* | (2006.01) |
| *H02H 7/26* | (2006.01) |
| *H01T 4/08* | (2006.01) |

(52) U.S. Cl.
CPC .............. *H02H 9/044* (2013.01); *H01T 4/08* (2013.01); *H02H 7/261* (2013.01)

(58) Field of Classification Search
CPC .................................................... H02H 9/044
See application file for complete search history.

(56) References Cited

U.S. PATENT DOCUMENTS

| | | |
|---|---|---|
| 2,030,179 A | 2/1936 | Potter |
| 3,167,729 A | 1/1965 | Hall |
| 3,323,083 A | 5/1967 | Ziegler |
| 3,596,165 A | 7/1971 | Andrews |
| 3,619,721 A | 11/1971 | Westendorp |
| 3,663,901 A | 5/1972 | Forney, Jr. |

(Continued)

FOREIGN PATENT DOCUMENTS

| | | |
|---|---|---|
| CH | 675933 | 11/1990 |
| JP | 08-066037 | 3/1996 |

(Continued)

*Primary Examiner* — Stephen W Jackson
(74) *Attorney, Agent, or Firm* — Snell & Wilmer LLP (57) ABSTRACT

A surge protector includes a housing defining a cavity and having an axis. The surge protector also includes first and second center conductors positioned within the cavity at the axial ends of the housing. The surge protector also includes an inner coupler positioned within the cavity, having a center portion, and being coupled to the first center conductor. The surge protector also includes an outer coupler positioned within the cavity, having an inner surface that defines a volume for receiving a portion of the center portion of the inner coupler, and coupled to the second center conductor. The surge protector also includes a first dielectric material positioned between the center portion and the inner surface. The surge protector also includes a first spiral inductor positioned within the cavity, having an outer curve and an inner curve, and being coupled to the first center conductor or the second center conductor.

20 Claims, 3 Drawing Sheets

(56) References Cited

U.S. PATENT DOCUMENTS

| | | | |
|---|---|---|---|
| 3,731,234 A | 5/1973 | Collins |
| 3,750,053 A | 7/1973 | LeDonne |
| 3,783,178 A | 1/1974 | Philibert |
| 3,831,110 A | 8/1974 | Eastman |
| 3,832,627 A | 8/1974 | Ohsawa |
| 3,845,358 A | 10/1974 | Anderson et al. |
| 3,921,015 A | 11/1975 | Obeda et al. |
| 3,944,937 A | 3/1976 | Fujisawa et al. |
| 3,956,717 A | 5/1976 | Fisher et al. |
| 3,980,976 A | 9/1976 | Tadama et al. |
| 4,021,759 A | 5/1977 | Camp |
| 4,046,451 A | 9/1977 | Juds et al. |
| 4,047,120 A | 9/1977 | Lord et al. |
| 4,112,395 A | 9/1978 | Seward |
| 4,262,317 A | 4/1981 | Baumbach |
| 4,356,360 A | 10/1982 | Volz |
| 4,359,764 A | 11/1982 | Block |
| 4,384,331 A | 5/1983 | Fukuhara et al. |
| 4,409,637 A | 10/1983 | Block |
| 4,481,641 A | 11/1984 | Gable et al. |
| 4,554,608 A | 11/1985 | Block |
| 4,563,720 A | 1/1986 | Clark |
| 4,586,104 A | 4/1986 | Standler |
| 4,689,713 A | 8/1987 | Hourtane et al. |
| 4,698,721 A | 10/1987 | Warren |
| 4,727,350 A | 2/1988 | Ohkubo |
| 4,901,183 A | 2/1990 | Lee |
| 4,952,173 A | 8/1990 | Peronnet et al. |
| 4,984,146 A | 1/1991 | Black et al. |
| 4,985,800 A | 1/1991 | Feldman et al. |
| 5,053,910 A | 10/1991 | Goldstein |
| 5,057,964 A | 10/1991 | Bender et al. |
| 5,102,818 A | 4/1992 | Paschke et al. |
| 5,122,921 A | 6/1992 | Koss |
| 5,124,873 A | 6/1992 | Wheeler et al. |
| 5,142,429 A | 8/1992 | Jaki |
| 5,166,855 A | 11/1992 | Turner |
| 5,170,151 A | 12/1992 | Hochstein |
| 5,278,720 A | 1/1994 | Bird |
| 5,321,573 A | 6/1994 | Persona et al. |
| 5,353,189 A | 10/1994 | Tomlinson |
| 5,412,526 A | 5/1995 | Kapp et al. |
| 5,442,330 A | 8/1995 | Fuller et al. |
| 5,534,768 A | 7/1996 | Chavannes et al. |
| 5,537,044 A | 7/1996 | Stahl |
| 5,611,224 A | 3/1997 | Weinerman et al. |
| 5,617,284 A | 4/1997 | Paradise |
| 5,625,521 A | 4/1997 | Luu |
| 5,667,298 A | 9/1997 | Musil et al. |
| 5,721,662 A | 2/1998 | Glaser et al. |
| 5,781,844 A | 7/1998 | Spriester et al. |
| 5,790,361 A | 8/1998 | Minich |
| 5,844,766 A | 12/1998 | Miglioli et al. |
| 5,854,730 A | 12/1998 | Mitchell et al. |
| 5,943,225 A | 8/1999 | Park |
| 5,953,195 A | 9/1999 | Pagliuca |
| 5,963,407 A | 10/1999 | Fragapane et al. |
| 5,966,283 A | 10/1999 | Glaser et al. |
| 5,982,602 A | 11/1999 | Tellas et al. |
| 5,986,869 A | 11/1999 | Akdag |
| 6,026,458 A | 2/2000 | Rasums |
| 6,031,705 A | 2/2000 | Gscheidle |
| 6,054,905 A | 4/2000 | Gresko |
| 6,060,182 A | 5/2000 | Tanaka et al. |
| 6,061,223 A * | 5/2000 | Jones | H01Q 1/1285 |
| | | | 361/119 |
| 6,086,544 A | 7/2000 | Hibner et al. |
| 6,115,227 A | 9/2000 | Jones et al. |
| 6,137,352 A | 10/2000 | Germann |
| 6,141,194 A | 10/2000 | Maier |
| 6,177,849 B1 | 1/2001 | Barsellotti et al. |
| 6,226,166 B1 | 5/2001 | Gumley et al. |
| 6,236,551 B1 | 5/2001 | Jones et al. |
| 6,243,247 B1 | 6/2001 | Akdag et al. |
| 6,252,755 B1 | 6/2001 | Willer |
| 6,281,690 B1 | 8/2001 | Frey |
| 6,292,344 B1 | 9/2001 | Glaser et al. |
| 6,342,998 B1 | 1/2002 | Bencivenga et al. |
| 6,381,283 B1 | 4/2002 | Bhardwaj et al. |
| 6,385,030 B1 | 5/2002 | Beene |
| 6,394,122 B1 | 5/2002 | Sibley et al. |
| 6,421,220 B2 | 7/2002 | Kobsa |
| 6,502,599 B1 | 1/2003 | Sibley et al. |
| 6,527,004 B1 | 3/2003 | Sibley et al. |
| 6,535,369 B1 | 3/2003 | Redding et al. |
| 6,721,155 B2 | 4/2004 | Ryman |
| 6,754,060 B2 | 6/2004 | Kauffman |
| 6,757,152 B2 | 6/2004 | Galvagni et al. |
| 6,785,110 B2 | 8/2004 | Bartel et al. |
| 6,789,560 B1 | 9/2004 | Sibley et al. |
| 6,814,100 B1 | 11/2004 | Sibley et al. |
| 6,816,348 B2 | 11/2004 | Chen et al. |
| 6,968,852 B1 | 11/2005 | Sibley |
| 6,975,496 B2 | 12/2005 | Jones et al. |
| 7,082,022 B2 | 7/2006 | Bishop |
| 7,104,282 B2 | 9/2006 | Hooker et al. |
| 7,106,572 B1 | 9/2006 | Girard |
| 7,130,103 B2 | 10/2006 | Murata |
| 7,159,236 B2 | 1/2007 | Abe et al. |
| 7,221,550 B2 | 5/2007 | Chang et al. |
| 7,250,829 B2 | 7/2007 | Namura |
| 7,430,103 B2 | 9/2008 | Kato |
| 7,440,253 B2 * | 10/2008 | Kauffman | H01P 1/045 |
| | | | 361/119 |
| 7,453,268 B2 | 11/2008 | Lin |
| 7,471,172 B2 | 12/2008 | Holst et al. |
| 7,507,105 B1 | 3/2009 | Peters et al. |
| 7,623,332 B2 | 11/2009 | Frank et al. |
| 7,675,726 B2 | 3/2010 | Bolz et al. |
| 7,808,752 B2 | 10/2010 | Richiuso et al. |
| 7,817,398 B1 | 10/2010 | Maples |
| 8,456,791 B2 * | 6/2013 | Jones | H01Q 1/50 |
| | | | 361/119 |
| 8,553,386 B2 * | 10/2013 | Penwell | H01T 4/08 |
| | | | 361/119 |
| 2002/0167302 A1 | 11/2002 | Gallavan |
| 2002/0191360 A1 | 12/2002 | Colombo et al. |
| 2003/0072121 A1 | 4/2003 | Bartel et al. |
| 2003/0151870 A1 | 8/2003 | Gronbach et al. |
| 2003/0179533 A1 | 9/2003 | Jones et al. |
| 2003/0211782 A1 | 11/2003 | Esparaz et al. |
| 2004/0100751 A1 | 5/2004 | Ammann |
| 2004/0121648 A1 | 6/2004 | Voros |
| 2004/0145849 A1 | 7/2004 | Chang et al. |
| 2004/0264087 A1 | 12/2004 | Bishop |
| 2005/0036262 A1 | 2/2005 | Siebenthall et al. |
| 2005/0044858 A1 | 3/2005 | Hooker et al. |
| 2005/0176275 A1 | 8/2005 | Hoopes et al. |
| 2005/0185354 A1 | 8/2005 | Hoopes |
| 2005/0206482 A1 | 9/2005 | Du Toit et al. |
| 2006/0044076 A1 | 3/2006 | Law |
| 2006/0082946 A1 | 4/2006 | Duenez et al. |
| 2006/0120005 A1 | 6/2006 | Van Sickle |
| 2006/0139832 A1 | 6/2006 | Yates et al. |
| 2006/0146458 A1 | 7/2006 | Mueller |
| 2007/0053130 A1 | 3/2007 | Harwath |
| 2007/0139850 A1 | 6/2007 | Kamel et al. |
| 2008/0170346 A1 | 7/2008 | Van Swearingen |
| 2009/0103226 A1 | 4/2009 | Penwell et al. |
| 2009/0109584 A1 | 4/2009 | Jones et al. |
| 2009/0284888 A1 | 11/2009 | Bartel et al. |
| 2009/0296430 A1 | 12/2009 | Rieux-Lopez et al. |
| 2011/0080683 A1 | 4/2011 | Jones et al. |
| 2011/0141646 A1 | 6/2011 | Jones et al. |
| 2011/0159727 A1 | 6/2011 | Howard et al. |
| 2011/0279943 A1 | 11/2011 | Penwell et al. |

FOREIGN PATENT DOCUMENTS

| | | |
|---|---|---|
| JP | 11-037400 | 2/1999 |
| JP | 2003-070156 | 3/2003 |
| JP | 2003-111270 | 4/2003 |
| KR | 10-2003-0081041 | 10/2003 |
| KR | 10-2009-0018497 | 2/2009 |

(56) References Cited

FOREIGN PATENT DOCUMENTS

| KR | 10-1189670 | 10/2012 |
| WO | WO 95/10116 | 4/1995 |
| WO | PCT/US03/17050 | 5/2003 |
| WO | WO 2011-119723 | 12/2011 |

* cited by examiner

FIG. 1

SECTION A-A

RADIO FREQUENCY SURGE PROTECTOR WITH MATCHED PISTON-CYLINDER CAVITY SHAPE

CROSS REFERENCE TO RELATED APPLICATIONS

This application claims the benefit and priority of U.S. Provisional Application No. 62/247,067, entitled "Radio Frequency Surge Protector with Matched Piston-Cylinder Cavity Shape," filed on Oct. 27, 2015, the entire disclosure of which is hereby incorporated by reference herein in its entirety.

BACKGROUND

1. Field

The invention relates to surge protection. More particularly, the invention relates to a radio frequency (RF) surge protector with a matched piston-cylinder cavity shape.

2. Description of the Related Art

Surge protectors are used in various environments to protect sensitive electrical components from damage due to power surges (such as electricity associated with a lightning strike). For example, some surge protectors are used to protect radio frequency (RF) components, such as components used in transmission of cellular signals. These surge protectors may be adapted to connect to coaxial cables that are in turn connected to the components to be protected. For example, a surge protector may be included on a coaxial cable extending away from a cellular tower.

Coaxial cables present specific RF impedance to signals propagating along the cables. Any change of impedance experienced by an RF signal along a signal path is likely to negatively affect the quality of the signal. For example, a change of impedance may result in a loss of signal strength or may increase an amount of noise associated with the signal. Thus, it is desirable for a surge protector to match the impedance of the coaxial cable to which it is connected.

SUMMARY

Described herein is a surge protector. The surge protector includes a housing defining a cavity and having an axis, a first axial end, and a second axial end. The surge protector also includes a first center conductor positioned within the cavity at the first axial end of the housing and a second center conductor positioned within the cavity at the second axial end of the housing. The surge protector also includes an inner coupler positioned within the cavity, having a center portion, and being coupled to the first center conductor. The surge protector also includes an outer coupler positioned within the cavity, having an inner surface that defines a volume for receiving at least a portion of the center portion of the inner coupler, and being coupled to the second center conductor. The surge protector also includes a first dielectric material positioned between the center portion and the inner surface. The surge protector also includes a first spiral inductor positioned within the cavity, having an outer curve and an inner curve, and being coupled to the first center conductor or the second center conductor.

Also described is a surge protector. The surge protector includes a housing defining a cavity and having an axis, a first axial end, and a second axial end. The surge protector also includes a first center conductor positioned within the cavity at the first axial end of the housing and a second center conductor positioned within the cavity at the second axial end of the housing. The surge protector also includes an inner coupler positioned within the cavity, having a shaft, and being coupled to the first center conductor. The surge protector also includes an outer coupler positioned within the cavity, having an inner surface that defines a volume for receiving at least a portion of the shaft of the inner coupler, and being coupled to the second center conductor. The surge protector also includes a first dielectric material positioned between the shaft and the inner surface. The surge protector also includes a first spiral inductor positioned within the cavity, having an inner curve coupled to the first center conductor and an outer curve. The surge protector also includes a second spiral inductor positioned within the cavity, having an inner curve coupled to the second center conductor and an outer curve, such that the inner coupler and the outer coupler are each at least partially positioned axially between the first spiral inductor and the second spiral inductor.

Also described is a surge protector. The surge protector includes a housing defining a cavity and having an axis, a first axial end, and a second axial end. The surge protector also includes a first center conductor positioned within the cavity at the first axial end of the housing and a second center conductor positioned within the cavity at the second axial end of the housing. The surge protector also includes an inner coupler positioned within the cavity, having a shaft and a base portion that defines an annular volume, and being coupled to the first center conductor. The surge protector also includes an outer coupler positioned within the cavity, having an inner surface that defines a volume for receiving at least a portion of the shaft of the inner coupler, being coupled to the second center conductor, and configured to at least partially be received by the annular volume of the base portion of the inner coupler. The surge protector also includes a first dielectric material positioned between the shaft and the inner surface. The surge protector also includes a second dielectric material positioned radially between the base portion of the inner coupler and the outer coupler. The surge protector also includes a first spiral inductor positioned within the cavity, having an inner curve coupled to the first center conductor and an outer curve. The surge protector also includes a second spiral inductor positioned within the cavity, having an inner curve coupled to the second center conductor and an outer curve, such that the inner coupler and the outer coupler are each at least partially positioned axially between the first spiral inductor and the second spiral inductor.

BRIEF DESCRIPTION OF THE DRAWINGS

Other systems, methods, features, and advantages of the present invention will be or will become apparent to one with skill in the art upon examination of the following figures and detailed description. It is intended that all such additional systems, methods, features, and advantages be included within this description, be within the scope of the present invention, and be protected by the accompanying claims. Component parts shown in the drawings are not necessarily to scale, and may be exaggerated to better illustrate the important features of the present invention. In the drawings, like reference numerals designate like parts throughout the different views, wherein:

DETAILED DESCRIPTION

Figure 1:
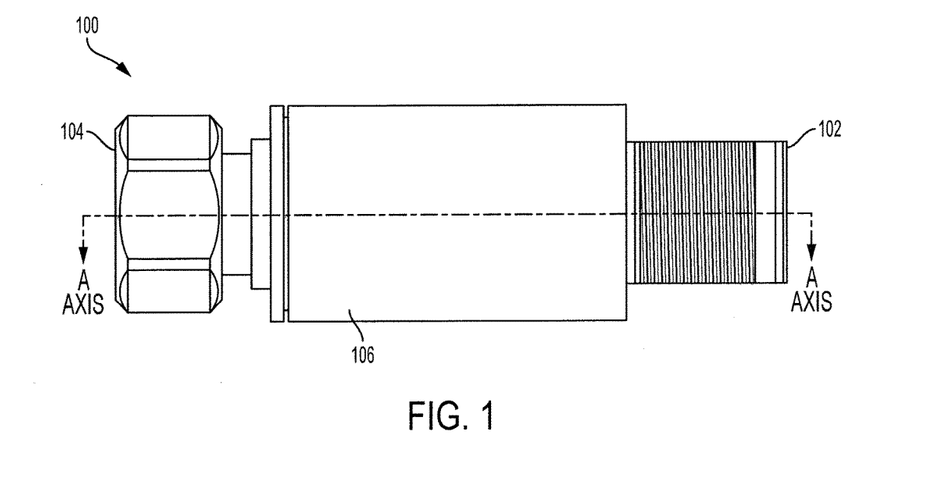
FIG. 1 is a side view of a surge protector for use in a radio frequency environment according to an embodiment of the present invention.
Figure 2:
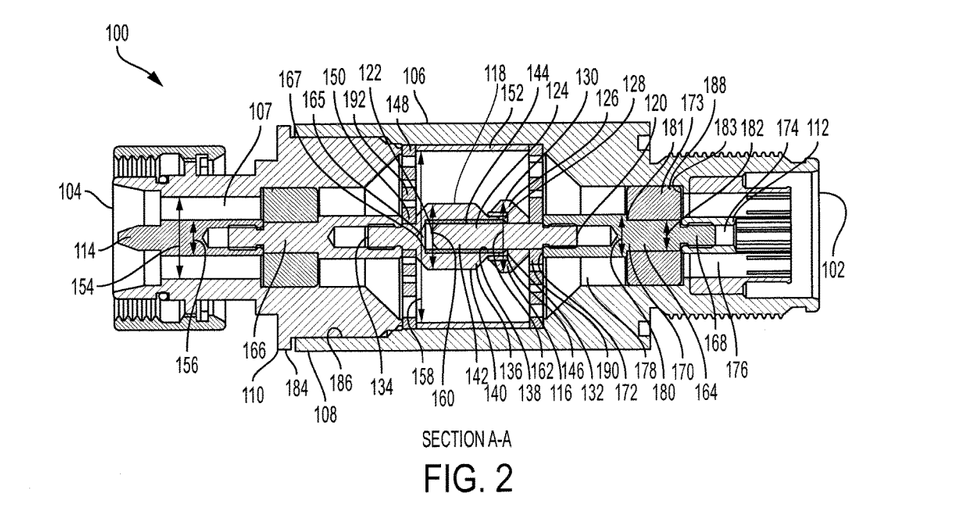
FIG. 2 is a cross-sectional view of the surge protector of FIG. 1 illustrating various internal components of the surge protector according to an embodiment of the present invention.
Figure 3:
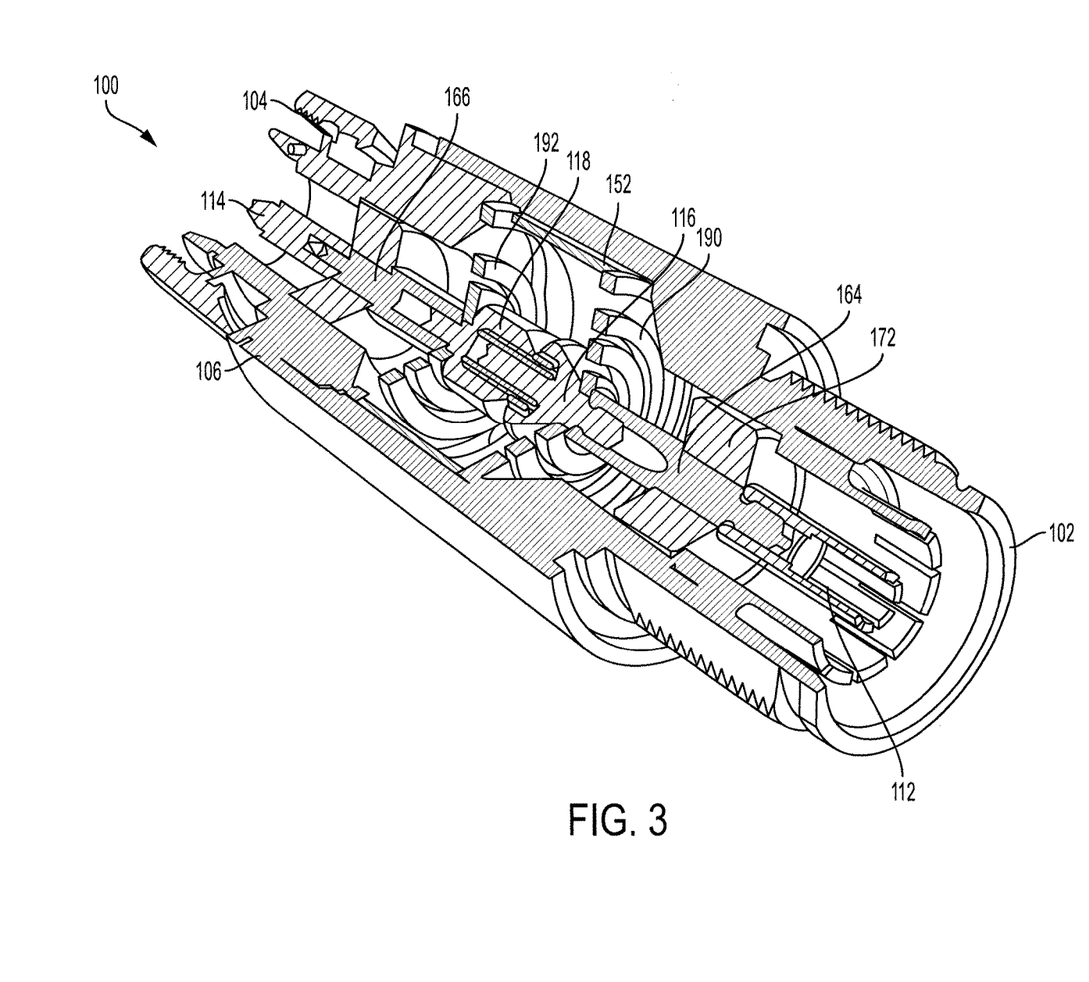
FIG. 3 is a perspective view of the surge protector of FIG. 1 illustrating the various internal components shown in FIG. 2 according to an embodiment of the present invention.

Referring to FIGS. 1, 2, and 3, a surge protector 100 is shown. The surge protector 100 may be inserted between a pair of coaxial cables or devices. For example, the surge protector 100 may be used in radio frequency communications to protect radio frequency components from power surges such as those resulting from lightning strikes.

The surge protector 100 has a longitudinal axis A-A along with a first axial end 102 and a second axial end 104. The first axial end 102 includes external, or male, threading and the second axial end 104 includes internal, or female, threading. In some embodiments, either or both of the first axial end 102 or the second axial end 104 may include male or female threading depending on the application in which the surge protector 100 will be used. In some embodiments, either or both of the first axial end 102 or the second axial end 104 may include any other connection type.

The surge protector 100 also includes a housing 106 having a first housing portion 108 and a second housing portion 110. The housing 106 defines a cavity 107. The surge protector 100 also includes a pair of center conductors including a first center conductor 112 and a second center conductor 114. The center conductors 112, 114 may be positioned at the axial ends 102, 104 of the surge protector 100. One of the center conductors 112, 114 may receive an input signal and the other of the center conductors 112, 114 may output the signal after any surge element has been removed from the signal. Due to the relatively symmetrical design of the surge protector 100, either of the first center conductor 112 or the second center conductor 114 may correspond to the input and the other of the first center conductor 112 or the second center conductor 114 may correspond to the output.

The surge protector 100 may also include an inner coupler 116 and an outer coupler 118. The inner coupler 116 may be electrically coupled to the first center conductor 112 via a first extender 164, and the outer coupler 118 may be electrically coupled to the second center conductor 114 via a second extender 166.

The inner coupler 116 may include a first axial end 120 positioned nearest the first center conductor 112 and a second axial end 122 positioned nearest the second center conductor 114. The inner coupler 116 may also include a center portion 124, which may resemble a shaft, and a base portion 126. The base portion 126 may define an annular volume 128. The inner coupler 116 may also include an outer surface 130.

The outer coupler 118 may include a first axial end 132 positioned nearest the first center conductor 112 and a second axial end 134 positioned nearest the second center conductor 114. The outer coupler 118 includes or defines a hollow cylinder 136 having an inner surface 138. The inner surface 138 defines a volume 142. The outer coupler 118 also includes an outer surface 140.

The inner coupler 116 is designed to interface with the outer coupler 118. In particular, the second axial end 122 of the inner coupler 116 interfaces with the first axial end 132 of the outer coupler 118. The center portion 124 of the inner coupler 116 is designed to be received by the volume 142 of the outer coupler 118. Furthermore, the first axial end 132 of the outer coupler 118 is designed to be received by the annular volume 128 defined by the base portion 126 of the inner coupler 116. The inner coupler 116 may also be referred to as a "piston" and the outer coupler 118 may also be referred to as a "cylinder."

A first dielectric material 144 is positioned in the volume 142 radially between the center portion 124 of the inner coupler 116 and the inner surface 138 of the outer coupler 118. Likewise, a second dielectric material 146 is positioned in the annular volume 128 radially between the outer surface 140 of the outer coupler 118 and the base portion 126 of the inner coupler 116. The first dielectric material 144 and the second dielectric material 146 may include a non-conductive dielectric such as Teflon.

The inner coupler 116 and the outer coupler 118 may each be made of a conductive material. The inner coupler 116 and the outer coupler 118 are not in direct contact. Any signal that propagates between the inner coupler 116 and the outer coupler 118 must propagate through the first dielectric material 144 and the second dielectric material 146. Thus, the interface between the inner coupler 116 and the outer coupler 118 may function in a similar manner as a capacitor. In that regard, a signal having a sufficiently low frequency may not propagate between the inner coupler 116 and the outer coupler 118.

The surge protector 100 also includes a first spiral inductor 190 and a second spiral inductor 192. Each of the first spiral inductor 190 and the second spiral inductor 192 has an inner curve 150 and an outer curve 148. The inner curve 150 of the second spiral inductor 192 is coupled to the outer coupler 118 and, thus, the second center conductor 114. The inner curve of the first spiral inductor 190 is coupled to the inner coupler 116 and, thus, the first center conductor 112. The outer curve 148 of each of the first spiral inductor 190 and the second spiral inductor 192 is coupled to the housing 106.

When a signal having a sufficiently low frequency is received by the inner curve 150 of either of the first spiral inductor 190 or the second spiral inductor 192, the low-frequency signal travels through the corresponding inductor to the housing 106 which is connected to a ground. In that regard, the low frequency signal will not propagate through the surge protector 100.

The surge protector 100 also includes a tube 152. The tube 152 may include a metal, such as copper, and thus be conductive. The tube 152 is positioned within the housing 106 axially between the first spiral inductor 190 and the second spiral inductor 192. In that regard, the tube 152 resists movement of the first spiral inductor 190 towards the second spiral inductor 192 and vice versa.

The cavity 107 defined by the housing 106 has a cavity diameter 154 in a location axially aligned with the center conductors 112, 114. The center conductors 112, 114 have a conductor diameter 156. It is desirable for the impedance of the surge protector 100 to match the impedance of any cable from which a signal is received. In order to match the impedance to that of the cable, the ratio of the conductor diameter 156 to the cavity diameter 154 should satisfy a given relationship. For example, in order to provide an impedance of 50 ohms, the ratio of the conductor diameter 156 to the cavity diameter 154 may be 4.3 to 10.

It is desirable for the entire surge protector 100 to match the desired impedance. Thus, continuing the example above, it is desirable for the entire surge protector 100 to have an impedance of 50 ohms. However, it may be desirable for the inner coupler 116 and the outer coupler 118 to have a greater diameter than the conductor diameter 156. Thus, because the dimensions of the couplers 116, 118 are different than the conductor diameter 156, the tube 152 may have a greater diameter than the cavity diameter 154.

In particular, the outer coupler 118 may have an outer coupler diameter 160 and the inner coupler 116 may have an inner coupler diameter 162. Likewise, the tube 152 may have a tube diameter 158. In some embodiments, in order for the impedance of the surge protector 100 to remain constant, the tube 152 may be selected such that a ratio of the outer coupler diameter 160 to the tube diameter 158 may be the same as the ratio of the conductor diameter 156 to the cavity diameter 154.

The outer surface 140 of the outer coupler 118 may be tapered towards the first axial end 102 and the second axial end 104. Likewise, the outer surface 130 of the inner coupler 116 may be tapered towards the first axial end 102 and the second axial end 104. This tapering may provide several functions. For example, the tapering of the outer surfaces 130, 140 may allow the signal propagating through the surge protector 100 to transition through the surge protector 100 with minimal loss. The tapering of the outer coupler 118 towards the second axial end 104 allows the second axial end 134 of the outer coupler 118 to extend through the second spiral inductor 192. Likewise, the tapering of the inner coupler 116 towards the first axial end 102 allows the first axial end 120 of the inner coupler 116 to extend through the first spiral inductor 190.

In some embodiments, the inner coupler diameter 162 may be greater than the outer coupler diameter 160. Experimentation has shown that this design of the inner coupler 116 reduces signal loss within the surge protector 100.

The surge protector 100 may also include a first extender 164 and a second extender 166 that are each conductive. The first extender 164 may be positioned in the housing 106 and coupled to the first center conductor 112 and the inner coupler 116. The second extender 166 may also be positioned in the housing 106 and maybe coupled to the second center conductor 114 and the outer coupler 118.

The first extender 164 may have a pin 168, a center portion 170, and an extender portion 178 having a receiving end 172. The pin 168 may be received by the first center conductor 112. In some embodiments, the pin 168 may include threading and may be screwed into the first center conductor 112. The receiving end 172 may define an opening for receiving the first axial end 120 of the inner coupler 116. In some embodiments, the first axial end 120 of the inner coupler 116 and the receiving end 172 of the first extender 164 may include threading and may be screwed together. In that regard, a signal may propagate between the first center conductor 112 and the inner coupler 116 via the first extender 164.

A dielectric ring 173 may surround the center portion 170 of the first extender 164, and a similar dielectric ring may surround a center portion of the second extender 166. Because the dielectric ring 173 has different properties than the air between the housing 106 and the extender portion 178 of the first extender 164, a center diameter 182 may be different than a receiving end diameter 180. This difference in the center diameter 182 and the receiving end diameter 180 is designed to accommodate the properties of the dielectric ring 173 so that the impedance of the entire surge protector 100 matches the desired impedance.

The housing 106 may include a barb 188 for helping to retain the dielectric ring 173 in place. The dielectric ring 173 may be inserted from the second axial end 104 towards the first axial end 102. As the dielectric ring 173 reaches the barb 188, the taper of the barb 188 allows the dielectric ring 173 to pass over the barb 188. Once the dielectric ring 173 is in place, the sharp angle of the barb 188 on the first axial end 102 resists movement of the dielectric ring 173 towards the second axial end 104.

The difference between the receiving end diameter 180 and the center diameter 182 forms a wall 181 between the extender portion 178 and the center portion 170. This wall 181 resists axial movement of the dielectric ring 173 towards the second axial end 104. Likewise, the cavity diameter 154 is less than a diameter of the cavity 107 surrounding the first extender 164, forming a wall 183 between the portion of the housing 106 surrounding the first center conductor 112 and the portion of the housing 106 surrounding the first extender 164. This wall 183 resists movement of the dielectric ring 173 towards the first axial end 102.

In order to assemble the surge protector 100, the first portion 108 and the second portion 110 of the housing 106 may be separated. The inner coupler 116 may be positioned with its first axial end 120 through the middle of the first spiral inductor 190 and may be coupled to the first extender 164. The first center conductor 112 may then be coupled to the first extender 164. Similarly, the outer coupler 118 may extend through the second spiral inductor 192 and be coupled to the second extender 166. The second extender 166 may then be coupled to the second center conductor 114.

Next, the dielectric rings 173 may be inserted into the cavity 107 of the corresponding housing portions 108, 110. Afterwards, the first portion 108 of the housing 106 may be positioned over the first center conductor 112, the first extender 164, and the inner coupler 116, and the second portion 110 of the housing 106 may be positioned over the second center conductor 114, the second extender 166, and the outer coupler 118. The first portion 108 of the housing 106 may include an inner surface 186 that is tapered. Similarly, the second portion 110 of the housing 106 may include an outer surface 184 that has a similar taper as the inner surface 186.

The second portion 110 of the housing 106 may be received by the first portion 108. In order to couple the first portion 108 to the second portion 110, force may be applied to the second portion 110 from the second axial end 104 and a force may be applied to the first portion 108 from the first axial end 102.

The surge protector 100 makes use of tight fitting joints and large press forces to maintain high pressure joints that aid in achieving a relatively great passive inter-modulation (PIM) distortion performance. Component wall thickness and joint designs are unique and ensure that the assembly of the surge protector 100 has a relatively high manufacturing yield with exceptional PIM performance, and that the device maintains its PIM performance throughout the life of the device.

For example, the housing 106 may be designed such that a relatively large amount of force, such greater than 100 pound-force, greater than 300 pound-force, or greater than 500 pound force, is required for the second portion 110 to be press fit within the first portion 108. This relatively large amount of force causes the first portion 108 to resist separation from the second portion 110 under normal operating conditions. In order to further improve PIM distortion performance under various conditions, the first portion 108 may have a radial thickness that is sufficiently great to resist a change in dimensions due to normal changes in temperature and pressure.

Operation of the surge protector 100 will now be described. In some embodiments, the surge protector 100 may operate as a radio frequency (RF) coaxial transmission line in the 698 MHz to 2.7 GHz frequency range. The surge protector 100 bidirectional broadband frequency response may have a return loss of greater than 26 dB and an insertion loss of less than 0.1 dB from 698 MHz to 2.7 GHz. The surge protector 100 supports the electromagnetic field propagation in the $TE_{01}$ (Transverse Electric field) mode in either direction, and is thus a bidirectional device. In the normal operating mode, the fields propagate from one end of the surge protector 100 to the other in the same manner as they operate in the coaxial transmission lines connected on each end. The fields move through the center conductors 112, 114, the first and second spiral inductors 190, 192, the tube 152, the inner coupler 116, the outer coupler 118, and/or the first and second dielectric materials 144, 146 with changing geometries that provide a 50 ohm matching impedance. When the fields cross the inner coupler 116 and the outer coupler 118, which have DC isolation, the fields couple to the other side via the external fields sustained in the cavity 107 of the housing 106 simultaneously with fields through the first and second dielectric materials 144, 146. Because of the unique inner and outer shapes and dimensions of the inner coupler 116 and the outer coupler 118, the inner coupler 116 and the outer coupler 118 pass the electric fields from one side to the other with a relatively excellent match and relatively little energy reflection, resulting in a very low insertion loss of less than 0.1 dB, and a relatively high return loss of well over 26 dB (see FIG. 4).

When a relatively large power surge (such as from lightning) propagates down the coaxial transmission line to the surge protector 100, the surge pulses first encounter the first or second spiral inductor 190, 192. Because the surge has a relatively low frequency, such as around 1 MHz, the surge may travel through the first or second spiral inductor 190, 192 to the grounded housing 106. A majority of each of the low frequency surge signals follow the spiral inductor 190, 192 to the grounded housing 106. The small portion of each surge that is not shunted to ground encounters the DC block in the inner coupler 116 and the outer coupler 118, which prevent a direct path to the other side of the coupler. However, since the combination of the inner and outer couplers 116, 118 and the first and second dielectric materials 144, 146 produce a relatively small-valued capacitor, some energy is coupled to the other side. This energy that passes through the inner and outer couplers 116, 118 reaches the other spiral inductor 190, 192 where it is shunted to ground. The result is that a relatively small portion of the surge signal gets coupled to the other side of the surge protector 100. This relatively small portion of the surge signal is sufficiently low that it will not damage any electronic components connected to the other side of the surge protector 100.

The unique design of the surge protector 100 using the matched DC blocking coupler shape in the cavity 107, along with the spiral inductors 190, 192 on each end, enables the combination of relatively high quality RF performance in the designed operating range along with a relatively great ability to shunt and block low frequency lightning surge energy. In addition, the unique mechanical design enables the surge protector 100 to be easily manufactured since its design is insensitive to expected tolerance variations in components. For example, because the hollow cylinder 136 is designed to have the axial space 165 that tapers to the point 167, the length of the center portion 124 of the inner coupler 116 may vary without affecting performance of the surge protector 100. The manufacturing process to produce the surge protector 100 is simplified and produces better and more consistent RF performance. For example, the process to make the hollow cylinder 136 may include forming the volume 142 using a drill, which is relatively easy and cost-effective relative to other potential methods of forming.

The center conductors 112, 114 may each be coupled to a coaxial cable where a center pin propagates the DC currents and the RF voltages and currents to flow through the surge protector 100. As long as the voltages are below the surge protection levels, currents will flow between the center conductors 112, 114 and the voltages at each end will be similar. The ratio of the radius of the center pin to the radius of its surrounding shell sets a fixed impedance of the coaxial cable (such as 50 ohms). The surge protector 100 matches this impedance by setting the ratio of a diameter of the signal conductors (the center conductors 112, 114, the extenders 164, 166, and the couplers 116, 118) to the ground conductors (the housing 106 and the tube 152) to correspond to the ratio of the center pen to the shell of the coaxial cable. As described above, the properties of the dielectric ring's 173 are accounted for when setting the diameter ratios.

The spiral inductors 190, 192 operate at a matched RF impedance to conduct the RF signals between the center conductors 112, 114 during normal operation and to allow the RF signals to pass through the surge protector 100 with minimal or no RF insertion or signal loss. The RF impedance of the spiral inductors 190, 192 may be at least 10 times the operating impedance. For example, the RF impedance of the spiral inductors 190, 192 may be at least 500 ohms for a 50 ohms system. In one embodiment, the spiral inductors 190, 192 have an inner radius of approximately 62.5 thousandths of an inch (mils) and an outer radius of approximately 430 mils.

For a 50 ohm impedance with a coaxial structure, the ideal (theoretical) ratio of the inner radius of the surrounding coupler cavity tube 152 to the inner coupler diameter 162 of the inner coupler 116 is $e^{5/6}=2.301$ with an air dielectric as in the center of the surrounding coupler cavity (i.e., the space between the couplers 112A, 112B and the coaxial tube 110). The actual ratio of the diameters of the inside of the tube 152 to the inner coupler diameter 162 is 20.41 mm/8.86 mm=2.303. The ratio being between 2.25 and 2.35 is important to providing and maintaining the 50 ohm matched impedance when an air dielectric surrounds the inner and outer couplers 116, 118. In one embodiment, the outer coupler diameter 160 of the outer coupler 118 is 7.85 mm. The ratio and/or the hexagonal shapes of the inner and outer couplers 116, 118 provide improved RF performance such as a relatively low insertion loss and a relatively high return loss. The axial space 165 is present between the end of the shaft 124 of the inner coupler 116 and the hollow cylinder 136 of the outer coupler 118. Therefore, the shaft 124 and the hollow cylinder 136 do not physically contact one another but rather are separated from one another by the first and second dielectric materials 144, 146.

The field moves through the empty (air) space above the two couplers 116, 118 because of the unique inner and outer shapes and dimensions of the inner and outer couplers 116, 118. The first and second couplers 116, 118 pass the fields from one side to the other with a relatively great match and relatively little reflection of energy, resulting in a relatively low insertion loss of less than 0.1 decibel (dB), and a relatively high return loss of well over 26 dB (see FIG. 4).

The dielectric materials 144, 146 are made of an insulating or non-conductive material such as Teflon and are formed in the shape of a tube or a cylinder for the given dimensions of the inner and outer couplers 116, 118.

The RF surge protector 100 relies on coaxially mated couplers 116, 118 separated by the first and second dielectric materials 144, 146 between the mating halves. The couplers 116, 118 are allowed to float linearly along their axis while maintaining appropriate capacitance which is primarily determined by their radial dimensions along both sides of the first and second dielectric materials 144, 146, and those dimensions are independent of the assembly process. The axial distance between the couplers 116, 118 is driven by the tube 152 which reduces the number of tolerances in the stack-up from a minimum of 10 contributing tolerances to 3 or less. The mechanical design enables the manufacturing process to assemble the components without significant influence over the RF performance of the completed assembly. The unique design of the two mating couplers 116, 118 enables the electromagnetic signal to couple without the mismatched discontinuities found in previous disc coupler designs. The two mating couplers 116, 118 behave as a continuous center conductor at the center of the cylindrical cavity, enabling the electromagnetic fields or waves to propagate through the surge protector 100 as if it were on a coaxial transmission line without discontinuities and an RF mismatch at the center of the surge protector 100. The smaller radius of the couplers 116, 118 enables a smaller cavity radius, thus reducing the overall size of the surge protector 100. The result is an improved RF match with improved return loss and insertion loss characteristics.

Figure 4:
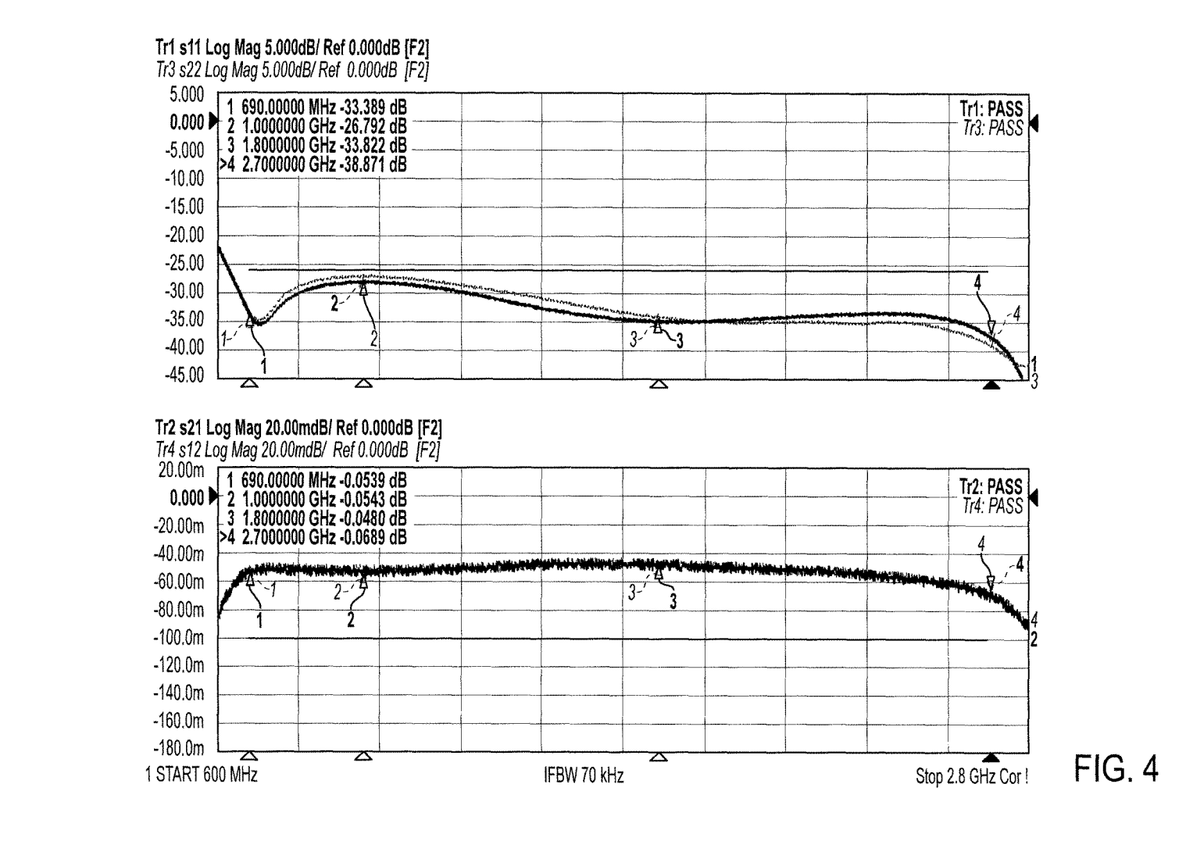
FIG. 4 is a network analyzer plot illustrating a frequency response of the surge protector of FIG. 1 according to an embodiment of the present invention.

Referring to FIG. 4, the analytic RF performance is shown as measured and displayed with a Vector Network Analyzer over the full frequency range of 690 to 2700 MHz. FIG. 4 shows the S-parameter measurements, $S_{11}$ and $S_{22}$ reflections from ports 1 and 2, respectively, on the upper display, and $S_{21}$ and $S_{12}$ transmissions through the device to ports 1 and 2, respectively, on the lower display. The traces on the upper display show that the level of reflected signal is more than 26 dB below the input reference level. The traces on the lower display show that the transmitted signal through the device has less than 0.1 dB of loss. Both pairs of traces are near overlays of each other indicating the device behaves the same from either direction, and thus it is truly a bi-directional device.

The low levels of reflected signal, greater than 26 dB, indicate a good match of the device to the 50 ohm impedance of the cables and radio system. The low levels of reflection indicate that nearly all of the applied signal propagates through the device. Likewise, the very low loss of the transmitted signal indicates that nearly all of the applied signal propagates through the device with very little being absorbed by the device as loss or reflected away from the device back toward the signal source. Both the low loss and low reflections are highly desirable and near ideal for RF performance of such a device in its normal functionality of connecting wireless transmitters and receivers to their antennas.

Exemplary embodiments of the methods/systems have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A surge protector comprising:
    a housing defining a cavity and having an axis, a first axial end, and a second axial end;
    a first center conductor positioned within the cavity at the first axial end of the housing and a second center conductor positioned within the cavity at the second axial end of the housing;
    an inner coupler positioned within the cavity, having a center portion, and being coupled to the first center conductor;
    an outer coupler positioned within the cavity, having an inner surface that defines a volume for receiving at least a portion of the center portion of the inner coupler, and being coupled to the second center conductor;
    a first dielectric material positioned between the center portion and the inner surface; and
    a first spiral inductor positioned within the cavity, having an outer curve and an inner curve, and being coupled to the first center conductor or the second center conductor.

2. The surge protector of claim 1 further comprising a second spiral inductor positioned within the cavity, having an outer curve and an inner curve, and being coupled to the other of the first center conductor or the second center conductor than the first spiral inductor, wherein the inner coupler and the outer coupler are each at least partially positioned axially between the first spiral inductor and the second spiral inductor.

3. The surge protector of claim 2 further comprising a tube positioned within the cavity, axially between the first spiral inductor and the second spiral inductor, and radially outward from the inner coupler and the outer coupler, and configured to resist movement of the first spiral inductor towards the second spiral inductor.

4. The surge protector of claim 3 wherein:
    the cavity of the housing has a cavity diameter about the first center conductor;
    the tube has a tube diameter;
    the first center conductor has a conductor diameter;
    the outer coupler has a coupler diameter; and
    a ratio of the conductor diameter to the conductor diameter is within ten percent of a ratio of the tube diameter to the coupler diameter.

5. The surge protector of claim 2 wherein:
    each of the inner coupler and the outer coupler has an outer surface having a diameter;
    the diameter of the outer surface of the inner coupler is greater than the diameter of the outer surface of the outer coupler;
    the diameter of the outer surface of each of the inner coupler and the outer coupler is greater than a diameter of the first center conductor and the second center conductor; and
    the outer surface of each of the inner coupler and the outer coupler tapers towards the first spiral inductor and the second spiral inductor.

6. The surge protector of claim 1 further comprising a second dielectric material and wherein:
    the outer coupler includes a first axial end positioned proximate to the first center conductor and a second axial end positioned proximate to the second center conductor;

the inner coupler also includes a base portion that defines an annular volume for receiving at least a portion of the second axial end of the outer coupler; and the second dielectric material is positioned radially between the base portion of the inner coupler and the second axial end of the outer coupler.

7. The surge protector of claim 1 wherein:

the outer coupler and the inner coupler each include a first axial end positioned proximate to the first center conductor and a second axial end positioned proximate to the second center conductor;

the center portion of the inner coupler has a length;

the volume defined by the inner surface of the outer coupler has a length that is greater than the length of the center portion such that an axial space is present between the second axial end of the center portion of the inner coupler and the second axial end of the volume of the outer coupler; and the volume defined by the inner surface of the outer coupler tapers towards a point at the second axial end to increase the axial space between the second axial end of the center portion and the second axial end of the volume.

8. The surge protector of claim 1 further comprising:

an extender having a pin, a center, and a receiving end that defines an opening for receiving a portion of the inner coupler or the outer coupler; and a dielectric ring positioned about an outer surface of the center of the extender, wherein:

the first center conductor defines a pin slot for receiving at least a portion of the pin of the extender, the cavity includes a first conductor portion about the first center conductor and an extender portion about the extender, the extender portion having a greater diameter than the first conductor portion, and the outer surface of the center of the extender has a diameter that is less than a diameter of the outer surface of the receiving end of the extender such that axial movement of the dielectric ring is restricted by the first conductor portion of the cavity and the receiving end of the extender.

9. The surge protector of claim 1, wherein:

the housing includes a first housing portion and a second housing portion, the first housing portion has an outer surface that tapers towards the second housing portion, and the second housing portion has an inner surface that tapers towards the first housing portion such that the first housing portion and the second housing portion can be press-fit together via a compressive force of at least 100 pound-force.

10. A surge protector comprising:

a housing defining a cavity and having an axis, a first axial end, and a second axial end;

a first center conductor positioned within the cavity at the first axial end of the housing and a second center conductor positioned within the cavity at the second axial end of the housing;

an inner coupler positioned within the cavity, having a shaft, and being coupled to the first center conductor;

an outer coupler positioned within the cavity, having an inner surface that defines a volume for receiving at least a portion of the shaft of the inner coupler, and being coupled to the second center conductor;

a first dielectric material positioned between the shaft and the inner surface;

a first spiral inductor positioned within the cavity, having an inner curve coupled to the first center conductor and an outer curve; and a second spiral inductor positioned within the cavity, having an inner curve coupled to the second center conductor and an outer curve, such that the inner coupler and the outer coupler are each at least partially positioned axially between the first spiral inductor and the second spiral inductor.

11. The surge protector of claim 10 further comprising a tube positioned within the cavity, axially between the first spiral inductor and the second spiral inductor, and radially outward from the inner coupler and the outer coupler, wherein:

the cavity of the housing has a cavity diameter about the first center conductor;

the tube has a tube diameter;

the first center conductor has a conductor diameter;

the outer coupler has a coupler diameter; and a ratio of the conductor diameter to the conductor diameter is within ten percent of a ratio of the tube diameter to the coupler diameter.

12. The surge protector of claim 10 wherein:

each of the inner coupler and the outer coupler has an outer surface having a diameter;

the diameter of the outer surface of the inner coupler is greater than the diameter of the outer surface of the outer coupler;

the diameter of the outer surface of each of the inner coupler and the outer coupler is greater than a diameter of the first center conductor and the second center conductor; and the outer surface of each of the inner coupler and the outer coupler tapers towards the first spiral inductor and the second spiral inductor.

13. The surge protector of claim 10 further comprising a second dielectric material and wherein:

the outer coupler includes a first axial end positioned proximate to the first center conductor and a second axial end positioned proximate to the second center conductor;

the inner coupler also includes a base portion that defines an annular volume for receiving at least a portion of the second axial end of the outer coupler; and the second dielectric material is positioned radially between the base portion of the inner coupler and the second axial end of the outer coupler.

14. The surge protector of claim 10 wherein:

the outer coupler and the inner coupler each include a first axial end positioned proximate to the first center conductor and a second axial end positioned proximate to the second center conductor;

the shaft of the inner coupler has a length;

the volume defined by the inner surface of the outer coupler has a length that is greater than the length of the shaft such that an axial space is present between the second axial end of the shaft of the inner coupler and the second axial end of the volume of the outer coupler; and the volume defined by the inner surface of the outer coupler tapers towards a point at the second axial end to increase the axial space between the second axial end of the shaft and the second axial end of the volume.

15. The surge protector of claim 10 further comprising:

an extender having a pin, a center, and a receiving end that defines an opening for receiving a portion of the inner coupler or the outer coupler; and a dielectric ring positioned about an outer surface of the center of the extender, wherein:
the first center conductor defines a pin slot for receiving at least a portion of the pin of the extender,
the cavity includes a first conductor portion about the first center conductor and an extender portion about the extender, the extender portion having a greater diameter than the first conductor portion, and
the outer surface of the center of the extender has a diameter that is less than a diameter of the outer surface of the receiving end of the extender such that axial movement of the dielectric ring is restricted by the first conductor portion of the cavity and the receiving end of the extender.

16. A surge protector comprising:

a housing defining a cavity and having an axis, a first axial end, and a second axial end;

a first center conductor positioned within the cavity at the first axial end of the housing and a second center conductor positioned within the cavity at the second axial end of the housing;

an inner coupler positioned within the cavity, having a shaft and a base portion that defines an annular volume, and being coupled to the first center conductor;

an outer coupler positioned within the cavity, having an inner surface that defines a volume for receiving at least a portion of the shaft of the inner coupler, being coupled to the second center conductor, and configured to at least partially be received by the annular volume of the base portion of the inner coupler;

a first dielectric material positioned between the shaft and the inner surface;

a second dielectric material positioned radially between the base portion of the inner coupler and the outer coupler;

a first spiral inductor positioned within the cavity, having an inner curve coupled to the first center conductor and an outer curve; and a second spiral inductor positioned within the cavity, having an inner curve coupled to the second center conductor and an outer curve, such that the inner coupler and the outer coupler are each at least partially positioned axially between the first spiral inductor and the second spiral inductor.

17. The surge protector of claim 16 further comprising a tube positioned within the cavity, axially between the first spiral inductor and the second spiral inductor, and radially outward from the inner coupler and the outer coupler, wherein:

the cavity of the housing has a cavity diameter about the first center conductor;
the tube has a tube diameter;
the first center conductor has a conductor diameter;
the outer coupler has a coupler diameter; and
a ratio of the conductor diameter to the conductor diameter is within ten percent of a ratio of the tube diameter to the coupler diameter.

18. The surge protector of claim 16 wherein:

each of the inner coupler and the outer coupler has an outer surface having a diameter;
the diameter of the outer surface of the inner coupler is greater than the diameter of the outer surface of the outer coupler;
the diameter of the outer surface of each of the inner coupler and the outer coupler is greater than a diameter of the first center conductor and the second center conductor; and
the outer surface of each of the inner coupler and the outer coupler tapers towards the first spiral inductor and the second spiral inductor.

19. The surge protector of claim 16 wherein:

the outer coupler and the inner coupler each include a first axial end positioned proximate to the first center conductor and a second axial end positioned proximate to the second center conductor;
the shaft of the inner coupler has a length;
the volume defined by the inner surface of the outer coupler has a length that is greater than the length of the shaft such that an axial space is present between the second axial end of the shaft of the inner coupler and the second axial end of the volume of the outer coupler; and
the volume defined by the inner surface of the outer coupler tapers towards a point at the second axial end to increase the axial space between the second axial end of the shaft and the second axial end of the volume.

20. The surge protector of claim 16 further comprising:

an extender having a pin, a center, and a receiving end that defines an opening for receiving a portion of the inner coupler or the outer coupler; and
a dielectric ring positioned about an outer surface of the center of the extender, wherein:
the first center conductor defines a pin slot for receiving at least a portion of the pin of the extender,
the cavity includes a first conductor portion about the first center conductor and an extender portion about the extender, the extender portion having a greater diameter than the first conductor portion, and
the outer surface of the center of the extender has a diameter that is less than a diameter of the outer surface of the receiving end of the extender such that axial movement of the dielectric ring is restricted by the first conductor portion of the cavity and the receiving end of the extender.

* * * * *